Dec. 1, 1942.     H. W. KLEIST     2,303,369
COOLING DEVICE
Filed May 4, 1940
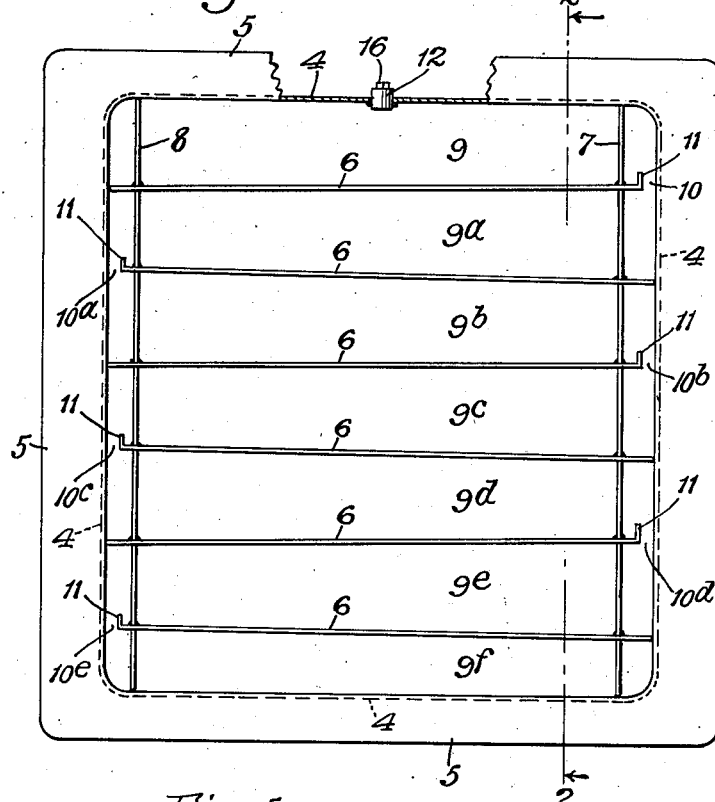
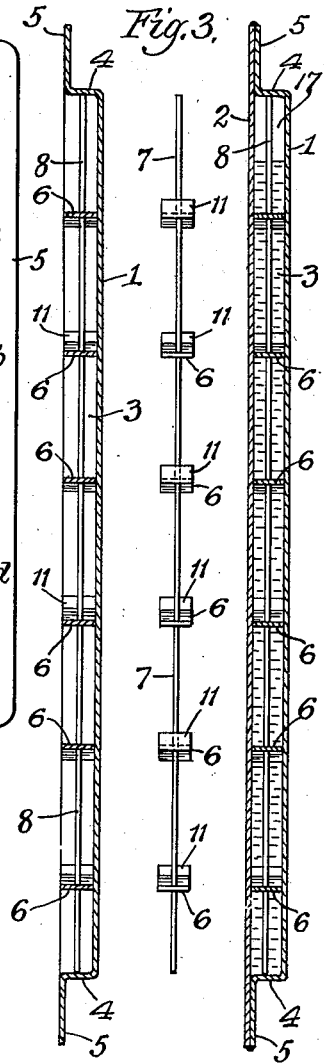
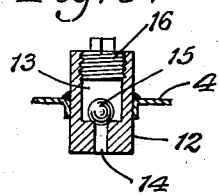
Inventor.
Herman W. Kleist.
by Parker & Carter
Attorneys.

Patented Dec. 1, 1942

2,303,369

UNITED STATES PATENT OFFICE 2,303,369

COOLING DEVICE

Herman W. Kleist, Chicago, Ill., assignor to Dole Refrigerating Company, Chicago, Ill., a corporation of Illinois Application May 4, 1940, Serial No. 333,351

5 Claims. (Cl. 62—95)

This invention relates to cooling devices and has for its object to provide a new and improved device of this description.

The invention has as a further object to provide a cooling device having a eutectic therein, which is cooled by external means and which can then be used for any desired suitable cooling purpose. The invention has as a further object to provide a cooling device which consists of an enclosed container with a eutectic therein, which is congealed by means outside of the cooling device, thereby providing a holdover effect and which can then be used wherever desired for cooling purposes.

The invention has as a further object to provide a cooling device consisting of an enclosed container, with means for dividing the interior thereof into a series of sections, with means for preventing any solids that may be precipitated in one section from passing into another section or into the bottom of the container. The invention has as a further object to provide a device of the kind described where the sides of the container are pressed against the dividing members by the outside atmosphere, due to withdrawing air from the container.

The invention has further objects which are more particularly pointed out in the accompanying description.

Referring now to the drawing,

Fig. 1 is a view of one form of container with one side removed;

Fig. 2 is a sectional view taken on line 2—2 of Fig. 1;

Fig. 3 is a view showing one construction for the dividing members which may be made separately and placed in the container;

Fig. 4 is a view similar to Fig. 2, with the removed side in position; and

Fig. 5 is a sectional view through the air withdrawing nipple.

Like numerals refer to like parts throughout the several figures.

Referring to the drawings, wherein I have shown one form of device embodying the invention, the container for the eutectic solution is formed in any desired manner. As herein shown, it is made of two sheets 1 and 2 which, when placed together, provide a space 3 for the eutectic solution. In the particular construction shown the sheet 1 is formed dish-shaped by providing it with the wall 4 extending all around which is at an angle to the main body of the sheet and providing a flange 5 extending entirely therearound.

Some means is provided for dividing the interior of the container into sections which are connected together, but which divide the eutectic into a plurality of sections. In the construction shown there is provided a series of dividing members 6 which are maintained in separated relationship by the separating members 7 and 8. These separating members are fastened to the dividing members 6 in any desired manner, as, for example, by welding, and are located preferably at each end of the dividing members.

The dividing members and the separating members may be arranged in the container in any desired way. I prefer, however, to connect the dividing members and the separating members together before they are placed in position, as shown, for example, in Fig. 3. This forms a frame as it were, and this frame may then be inserted in the open side of the sheet 1, as shown in Fig. 2. The sheet 2 is then placed in position and its edge connected with the flange 5 in any desired manner, as, for example by welding, so as to form a hermetically sealed container. The frame construction divides the container into a series of sections 9, 9a, 9b, 9c, 9d, 9e, 9f, etc., depending upon the size of the container. This entire frame construction is preferably not connected with either of the sheets 1 and 2 so that the parts are free to move more or less, due to expansion and contraction and under the pressure due to the freezing of the eutectic.

The dividing members are preferably arranged so that there are openings 10, 10a, 10b, 10c, 10d, 10e, etc., at opposite ends so as to permit the eutectic solution to freely flow from one section to another. The dividing members 6 are arranged so that any solids precipitated from the eutectic in any one of the sections will remain in that section. It has been found, for example, that in some eutectics there is a precipitation of solids and if this precipitation can all accumulate in one place, as, for example, in the bottom of the container, it will not be redissolved and this leaves substantially water at the upper end of the container and very materially affects and detracts from the action of the device. It has also been ascertained that by dividing the container into sections and maintaining any precipitation of solids in these sections, the precipitated material will be redissolved and a proper eutectic may thus be maintained throughout the container.

In order to maintain any precipitation of solids from the eutectic in each of the sections, the dividing members are preferably inclined so that the ends where the openings 10, 10a, etc., are located are higher than the other ends, so that any solids that are precipitated would have no tendency to flow out of the openings 10, 10a, etc. In order to prevent this there may also be provided obstructing members 11 connected with the dividing members so as to obstruct any passage of the precipitated material from one dividing member to another. The inclining of the dividing members and the obstructing members may be used either together or separately to secure the desired result.

Some means is provided for introducing the eutectic material into the container and for drawing air from the container. Any suitable device for this purpose may be used. In the construction shown there is a nipple 12 preferably in the wall 4, which is provided with a passageway having an enlarged section 13 and a narrow section 14. There is a ball valve 15 which normally closes the narrow section 14. There is a plug 16 for closing the larger section 13 of the passageway. When the device is ready for use, the eutectic solution is inserted through the passageways 13 and 14, the ball valve 15 being removed at this time. The container is filled only partially, leaving a space 17 at the top. The ball valve 15 is then placed in position and air is drawn out of this space by any suitable means, until the sheets 1 and 2 are pressed tightly against the dividing members 6 by the pressure of the outside atmosphere. The amount of vacuum will of course depend upon the conditions presented and the effect desired. The plug 16 is then placed in position and preferably arranged by solder or other means to form an air tight closure.

When the device is thus assembled and it is desired to use it, it is cooled from any suitable outside source so as to cool the eutectic solution. Any desired eutectic solution may be used, depending upon the result desired. In practice I have used eutectic solutions that congealed from twenty-six degrees above zero Fahrenheit to many degrees below zero Fahrenheit. After the device is cooled it is then placed in position where it is desired to use it and will produce a cooling effect for several hours. It may be used, for example, in ice cream cabinets, trucks and conveyances and any other suitable place. It is very efficient in use, for example, as a substitute for dry ice.

I claim:

1. A cooling device comprising a container comprising opposed flat sheets, a plurality of dividing members extending in a substantially horizontal direction across said container, separating members for separating said dividing members and, holding them in proper spaced relationship so as to divide the container into a series of substantially horizontally extending sections, and connections at alternate ends of said dividing members to connect said sections together.

2. A cooling device comprising a hermetically sealed container comprising opposed flat sheets, a plurality of dividing members extending in a substantially horizontal direction across said container, separating members for separating said dividing members and keeping them in proper spaced relationship so as to divide the container into sections, connections at alternate ends of said dividing members to connect said sections together, an admission opening for inserting a eutectic in said container, the pressure on the interior of said container being less than the pressure of the atmosphere on the outside thereof, so that the sides of the container are tightly pressed against said dividing members.

3. A cooling device comprising a container made up of two opposed sheets of material, with a space between them, a plurality of dividing members in said space extending thereacross in a substantially horizontal direction, separating members for separating said dividing members and keeping them in proper spaced relationship so as to divide said space in the container into a plurality of substantially horizontally extending sections, fastening means for fastening said dividing members and separating members together to form a unitary structure which is bodily inserted in said space and held in place by the two sheets when connected together, and connections at alternate ends of said dividing members to connect said sections together.

4. A cooling device comprising a container having a eutectic therein, a plurality of dividing members extending across said container, means for maintaining said dividing members in proper spaced relationship so as to divide the container into sections, connections at the ends of said dividing members to connect said sections together, and means for maintaining precipitated material from said eutectic on said several dividing members, so that such precipitated material is divided into separated portions located at different heights along the container which portions will be redissolved when the eutectic melts.

5. A cooling device comprising a hermetically sealed container, an inlet for inserting a eutectic therein, a plurality of dividing members extending across said container, separating members for separating said dividing members and keeping them in proper spaced relationship so as to divide the container into sections, connections at the ends of said dividing members to connect the spaces between said sections together, means for maintaining precipitated material from said eutectic on said several dividing members, so that such precipitated material is divided into separated portions located at different heights along the container, the pressure on the interior of the container being less than the pressure of the atmosphere on the outside of the container so that the sides of the container are tightly pressed against said dividing members.

HERMAN W. KLEIST.